(12) United States Patent
König

(10) Patent No.: US 9,825,494 B2
(45) Date of Patent: Nov. 21, 2017

(54) ROTOR OF AN ELECTRIC MACHINE

(75) Inventor: Werner König, Herrenberg (DE)

(73) Assignee: DAIMLER AG, Stuttgart (DE)

( * ) Notice: Subject to any disclaimer, the term of this patent is extended or adjusted under 35 U.S.C. 154(b) by 1232 days.

(21) Appl. No.: 13/459,152

(22) Filed: Apr. 28, 2012

(65) Prior Publication Data

US 2012/0206006 A1    Aug. 16, 2012

Related U.S. Application Data

(63) Continuation-in-part of application No. PCT/EP2010/006386, filed on Oct. 19, 2010.

(30) Foreign Application Priority Data

Nov. 10, 2009    (DE) .......................... 10 2009 052 596

(51) Int. Cl.
*H02K 21/12* (2006.01)
*H02K 1/27* (2006.01)
*H02K 15/03* (2006.01)

(52) U.S. Cl.
CPC ............. *H02K 1/274* (2013.01); *H02K 15/03* (2013.01)

(58) Field of Classification Search
CPC    H02K 1/27; H02K 1/28; H02K 1/274; H02K 15/03; H02K 1/2706
USPC ........ 310/156.01, 156.53, 216.007, 216.009, 310/216.058, 423; 29/521, 522.1
See application file for complete search history.

(56) References Cited

U.S. PATENT DOCUMENTS

| | | | | |
|---|---|---|---|---|
| 3,663,850 | A | * | 5/1972 | Phelon .......................... 310/153 |
| 4,336,649 | A | * | 6/1982 | Glaser .............................. 29/598 |
| 7,378,774 | B2 | * | 5/2008 | Torii et al. ............. 310/216.041 |
| 7,893,591 | B2 | * | 2/2011 | Myojin .................. 310/216.013 |
| 2007/0046125 | A1 | * | 3/2007 | Torii et al. ................ 310/156.53 |
| 2007/0252469 | A1 | | 11/2007 | Nishiura et al. |
| 2008/0201936 | A1 | * | 8/2008 | Hoshino et al. ................ 29/598 |
| 2009/0146519 | A1 | * | 6/2009 | Myojin .................... 310/156.53 |

FOREIGN PATENT DOCUMENTS

| | | |
|---|---|---|
| CH | 318590 | 2/1957 |
| DE | 100 37 410 | 2/2003 |
| JP | 20041254403 | 9/2004 |
| JP | 2005 137117 | 5/2005 |
| JP | 2005137117 | 5/2005 |
| JP | 2005 168128 | 6/2005 |
| JP | 2005168128 | 6/2005 |
| WO | WO 03/003541 | 1/2003 |

* cited by examiner

*Primary Examiner* — Quyen Leung
*Assistant Examiner* — Naishadh Desai
(74) *Attorney, Agent, or Firm* — Klaus J. Bach

(57) ABSTRACT

In a rotor of an electric machine, which rotor consists of individual segments which each have a first part which is in contact with a second cooperating part wherein the first part of an individual segment and the second cooperating part of an adjacent individual segment are positively interlocked in the radial and circumferential directions resulting in a self-supporting annular structure of the assembled rotor. The individual sections have openings accommodating permanent magnets which are fixed in the openings by wall sections bent into the openings during assembly of the segments for fixing the permanent magnets in the openings as the individual segments are joined to form a ring.

3 Claims, 3 Drawing Sheets

ROTOR OF AN ELECTRIC MACHINE

This is a Continuation-In-Part application of pending international patent application PCT/EP2010/006386 filed Oct. 19, 2010 and claiming the priority of German patent application 10 2009 052596.3 filed Nov. 10, 2009.

BACKGROUND OF THE INVENTION

The invention relates to a rotor for an electric machine having a rotor consisting of individual segments which are joined together.

Rotors for electric machines are known in many forms and can be designed for specific tasks to be performed by the electric machine in question.

In DE 10037410 A1, a rotor of an electric machine is described which is produced from a sheet metal strip. For this purpose, a chain of subsegments of the rotor is stamped from a sheet metal strip, these subsegments being firmly joined together at a point. Via this connecting point, the chain is then bent, to produce a rotor which gains axial depth by overlapping several sheet metal layers. As the subsegments are already firmly joined together by way of the connecting point, this rotor does not require any additional means for attaching the subsegments. The subsegments are already attached by the material bridge of the connecting point.

WO 2003/003541 A1 discloses a rotor of an electric machine which is built up from individual segments. In the specification this is primarily recommended for electric motors with a large inner diameter, in order to facilitate their assembly and handling. The segments are described for the case of a synchronous motor as mounting plates provided at the outside thereof with permanent magnets. These segments are then attached to the rotor in such a way that, if a repair is required, individual segments can be removed and replaced. In the manufacturing process, each individual segment has to be attached to the rotor, which increases assembly costs and the number of process steps.

JP 2005 137117 A describes a rotor of an electric machine, which rotor comprises individual segments. The individual segments have an opening which extends in the axial direction for the accommodation of a permanent magnet and are joined to one another by a positive connection. By a further positive connection, the individual segments can be joined to a rotor support.

JP 2005 137117 A, on the other hand, describes a rotor of an electric machine, which rotor comprises an element in the form of a chain, wherein the element can be deformed from a straight shape into an annular rotor element by way of a deformable region between the joined chain links. The elements are provided with openings in the axial direction or recesses at the outer circumference for installing permanent magnets.

It is the principal object of the present invention to provide an arrangement which simplifies the manufacture of a rotor.

SUMMARY OF THE INVENTION

In a rotor of an electric machine, which rotor consists of individual segments which each have a first part which is in contact with a second cooperating part wherein the first part of an individual segment and the second cooperating part of an adjacent individual segment are positively interlocked in the radial and circumferential directions resulting in a self-supporting annular structure of the assembled rotor. The individual sections have openings accommodating permanent magnets which are fixed in the openings by wall sections bent into the openings during assembly of the segments for fixing the permanent magnets in the openings as the individual segments are joined to form a ring.

In accordance herewith, in a rotor made from individual segments, a first part of each individual segment and an adjacent second corresponding part of the adjacent part of the next individual segment are designed such that a positive connection can be established between the first part and the second part in the radial and circumferential directions. As a result of this positive connection in the radial and circumferential directions, a stable, self-supporting annular structure is created in the assembled state of the segments. There is therefore no need for further fasteners or retaining devices as the individual segments are joined to form a ring.

In an advantageous further development, the rotor includes a first part of the individual segment and a second corresponding part of the adjacent individual segment which are designed such that the two adjacent individual segments substantially contact each other along the first part after assembly.

For manufacturing reasons, a complete contact between the first part of the individual segment and the second corresponding part of the adjacent individual segment is made difficult to achieve. The design should nevertheless be such that as large as possible a contact surface is created between the two adjacent individual segments in the assembled rotor, because a magnetic flux in the rotor is influenced only slightly by this contact surface. In this context, it is recommended that the contact surface of the two adjacent individual segments should amount to more than 90% of the theoretically possible contact surface between the first part of the individual segment and the second corresponding part of the adjacent individual segment.

Preferably, the rotor, the first part of the individual segment and the second corresponding part of the adjacent individual segment are shaped such that only a sub-region of the first part of the individual segment and a corresponding sub-region of the second corresponding part of the adjacent individual segment effect the positive connection between the first part and the second part in the radial and circumferential directions.

In this way, the positive connection in the radial and circumferential directions can be ensured with simple shapes which do not have to extend along the whole part of the individual segment. Simple shapes are easier to produce.

In a further development of the rotor, the shape of the first part of the individual segment and the second corresponding part of the adjacent individual segment is advantageously in the form of a dovetail joint.

This shape meets the conditions of positive connection in the radial and circumferential directions. The shape can be produced using simple means, and the dimensioning in accordance with the material properties of the individual segments is simple as well.

In an advantageous further development of the rotor, the shape of the first part of the individual segment and the second corresponding part of the adjacent individual segment is designed as a pine-tree joint.

By distributing the positive connection in the radial and circumferential directions among a plurality of overlap regions, each individual overlap region can be kept smaller. This can reduce material waste in the production process.

In an advantageous further development of the rotor, all individual segments have the same shape.

This simplifies production, because only a single shape of the individual segment has to be produced and the position of an individual segment within the ring freely selectable. There is therefore no need to take account of the position and sequence of the respective individual segment in the assembly process.

In an advantageous further development, each individual segment of the rotor is formed from a sheet pack.

The shapes of the first part of the individual segment and the second corresponding part of the adjacent individual segment can be produced particularly simply by cutting the complete shape of the individual segment from a sheet metal strip. In order to obtain from the shape of the individual segment with the depth of a sheet metal strip the required axial depth of the individual segment for the rotor, several die-cut shapes are combined to provide a sheet pack. The material of the sheet-metal strip also offers advantageous magnetic properties.

To generate a magnetic flux in the rotor, an advantageous further development of the rotor has in each individual segment an opening in the axial direction, which opening accommodates a permanent magnet. The opening in the axial direction forms a pocket which is limited in the radial direction and in the circumferential direction of the rotor. The shape of the opening is advantageously constant in the axial direction, which simplifies the production and the machining of the opening. The shape of the opening in the axial direction is further advantageously matched to the permanent magnet to be installed so that the latter can easily be inserted and fixed in the opening.

By installing the permanent magnet into an opening in the axial direction, the position of the permanent magnet in the radial direction is determined by the contour of the opening. The centrifugal forces of the rotating rotor, which are effective on the permanent magnet, act in the radial direction and are transmitted to the radially outer contour of the opening so that no special fixing arrangements for the permanent magnet are needed.

In an advantageous further development of the rotor, each individual segment has a deformable region. The deformable region is situated between the first part of the individual segment and the opening for the accommodation of a permanent magnet and/or between the second corresponding part of the individual segment and the opening for the accommodation of a permanent magnet. After joining the individual segments, wherein the first part of the individual segment is brought into engagement with the second corresponding part of the adjacent individual segment, the deformable region is deformed such that the size of the opening for the accommodation of the permanent magnet is reduced in the radial and/or in the circumferential direction.

The permanent magnet is advantageously installed into the opening of the individual segments before the individual segments are assembled. The reduction of the opening by the deformable region of the individual segment after the assembly of the individual segments fixes the permanent magnet in the opening. There is no need for further fastening steps or fasteners.

The opening in the axial direction and the deformable region are designed such that a permanent magnet can simply be inserted into the opening and the deformable region, following the assembly of the individual segments, reduces the size of the opening so far that the permanent magnet is clamped in the opening without the clamping forces exceeding a critical value at which structural damage would develop in the permanent magnet.

In an advantageous further development of the rotor, the deformable region is situated within the opening for the accommodation of the permanent magnet in the radial direction. The deformable region is shaped such that, after the assembled individual segments have been press-fitted to a rotor support, the deformable region is deformed in such a way that the size of the opening for the accommodation of the permanent magnet is reduced in the radial direction.

The permanent magnets are advantageously installed into the openings of the individual segments before the assembled individual segments have been press-fitted to the rotor support. The size reduction of the openings in the radial direction after press-fitting to the rotor support, which is due to the deformable regions of the individual segments, locates the permanent magnets securely in the openings. There is no need for further fastening steps or fasteners.

The opening in the axial direction of the individual segment and the deformable region are designed such that a permanent magnet can simply be inserted into the opening and the deformable region, after press-fitting to the rotor support, reduces the size of the opening until the permanent magnet is clamped in the opening without the clamping forces exceeding a critical value at which structural damage would develop in the permanent magnet.

According to the invention, in an advantageous further development of the rotor, the axial opening in the individual segment is bounded by a third movable part. This movable part is designed such that the radial dimension of the opening changes as the third part moves. According to the invention, this change of the radial dimension of the opening does not have to be the same everywhere, so that one end of the third movable part is fixed to the individual segment while the other end is radially movable about this point. This movable end has a shape which in the closed state comes into engagement with an outward curvature of the individual segment or the adjacent individual segment, so that the outward curvature engages the movable part. According to the invention, the outward curvature may alternatively be a part of the adjacent individual segment of the assembled rotor.

The invention will become more readily apparent from the following detailed description of a particular embodiment of the invention with reference to the accompanying drawings:

DETAILED DESCRIPTION OF A PARTICULAR EMBODIMENT

Figure 1:
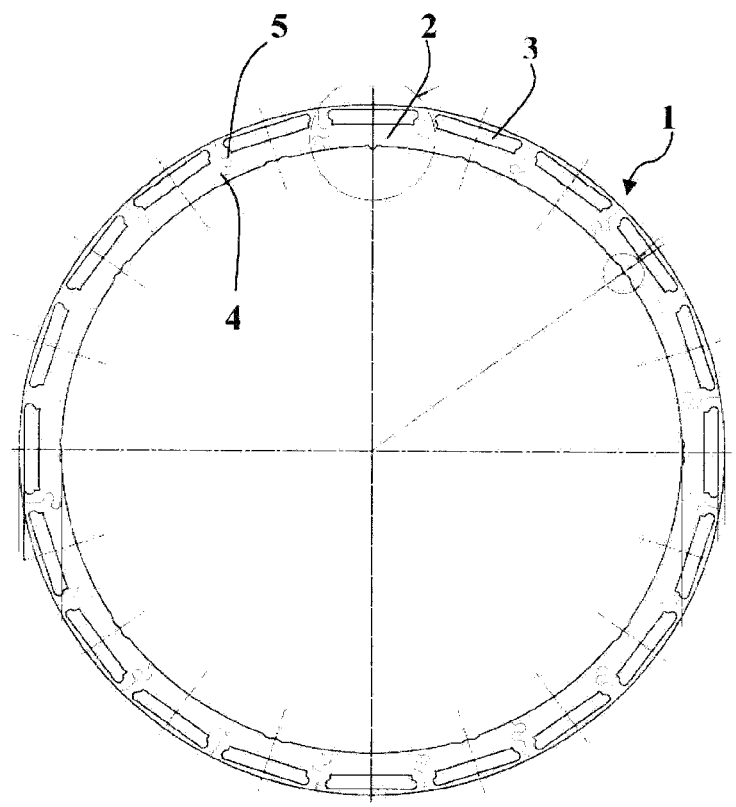
FIG. 1 shows an assembled segmented rotor of an electric machine.

FIG. 1 shows an axial view of a segmented rotor 1 of an electric machine. The rotor 1 is made up from individual segments 2 which are arranged to form a ring.

Compared to the production of a rotor from a chain of subsegments which are not independent individual segments, the production of a rotor 1 from individual segments 2 offers the advantage that the individual segments 2 can be stamped more easily, because the individual segments 2 can be arranged on the sheet metal strip in a more variable array, which means less waste of the sheet metal strip. In addition, in stamping a chain of subsegments, the connecting point requires particular consideration, which in turn requires increased machining precision.

The individual segments 2 each have an axial opening 3 for the accommodation of a permanent magnet. The axial openings 3 delimit the position of the permanent magnet in the radial and circumferential directions in such a way that the permanent magnet is fixed in the opening. This offers the advantage that the permanent magnets do not have to be secured by additional means against the centrifugal forces of the rotating rotor and require only a slight retaining force in the axial direction. The forces of the magnetic field which act on the permanent magnet are also transmitted to the external contour of the axial opening 3 and do not act in the axial direction.

The rotor 1 shown here is therefore suitable for use in a permanently excited synchronous motor.

FIG. 1 shows that, advantageously, the rotor 1 is assembled from identical individual segments 2. This simplifies both the manufacture of the individual segments, because only identical individual segments 2 have to be produced, and the assembly of the rotor 1, because the sequence of individual segments 2 within the annular arrangement is interchangeable and therefore freely selectable.

Each individual segment 2 has a first part 4 which is in contact with a second corresponding part 5 of the adjacent individual segment 2. In this embodiment of the rotor 1, the first part 4 is a section of the lateral surface of the individual segment 2 in the circumferential direction. Accordingly, the second part 5 is a section of the opposite lateral surface of the individual segment 2. As a result of the annular structure, this applies to all individual segments 2, because each individual segment 2 has a neighbor while at the same time being a neighbor for the next individual segment 2. FIG. 1 shows a special shaping of the first part 4 of the individual segment 2 and the second corresponding part 5. Between the two adjacent individual segments 2, a positive connection is obtained in the radial and circumferential directions by the first part 4 and the second corresponding part 5. This advantageous shaping of the first part 4 and the second corresponding part 5 generates a self-supporting structure. An advantageous shaping of the first part 4 and the second corresponding part 5 is illustrated with reference to a section of the rotor 1 in FIGS. 3 and 4 and described in greater detail with reference thereto.

As a result of a positive connection both in the radial direction and in the circumferential direction, the individual segments can be assembled to form a ring only in the axial direction. The individual segments are axially movable relative to one another, which in the present context means that the axial orientation of the individual segment 2 with respect to its later position within the rotor 1 and its axis of rotation.

The positive connection in the radial and circumferential directions results in a self-supporting structure of the rotor ring which can be press-fitted to a rotor support. The rotor 1 is thereby firmly joined to the rotor support and supported thereon for momentum transmission. The rotor support is not shown in the figures. No further fastenings are required to hold the individual segments 2 on the rotor support. At the same time, by press-fitting the rotor ring to the rotor support, the positive connection of adjacent individual segments 2 is subjected to a clamping action, so that the individual segments 2 can no longer be displaced relative to one another in the axial direction. The individual segments 2 are therefore securely located on the rotor support in all directions.

The positive connection in the radial direction does not only allow the press-fitting of the rotor 1 to the rotor support, but it also counteracts the centrifugal force of the rotating rotor 1. As a result of the positive connection in the radial and circumferential directions, the individual segments can therefore be assembled to produce a stable rotor 1 without any further fastening devices. Other methods required for assembling the individual segments 2 to produce a rotor 1, such as the welding, bonding or bolting of the individual segments, can be omitted. The repetitive process steps involved in mounting each individual segment 2 on the rotor support, the number of which steps equals the number of the individual segments 2, can be omitted as well.

As a result of this positive connection in the radial direction, this segmented rotor 1 is so stable that it can be used even in fast rotating electric machines. Additional fastening devices would, because of their additional mass, increase the moment of inertia of the rotor 1, which in turn would have a negative effect on the efficiency of the electric machine.

Separate fastening devices, welding or bonding also affect the magnetic properties of the rotor 1.

Figure 3:
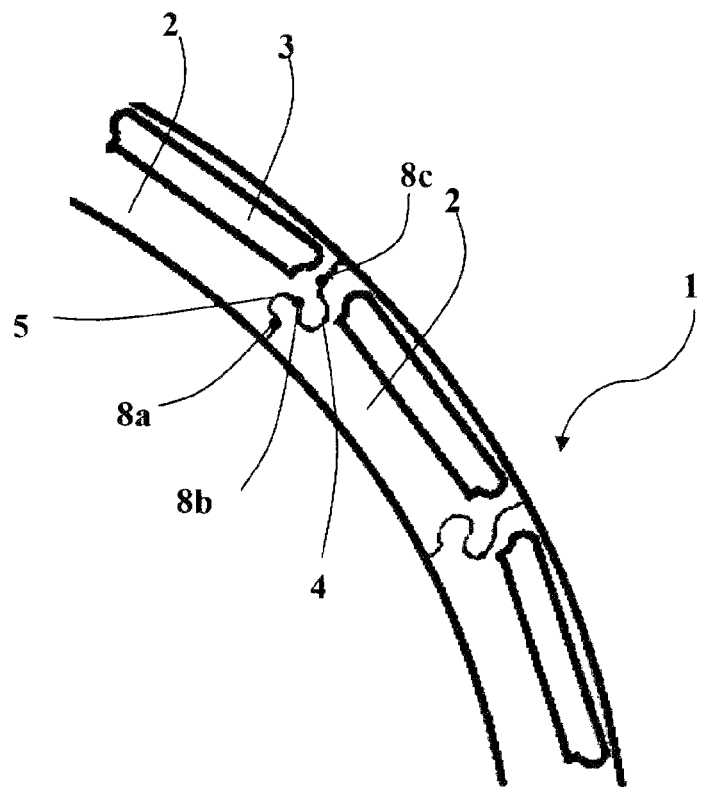
FIG. 3 shows a section of a rotor assembled from individual segments, the individual segments showing a first part of the individual segment and a second corresponding part of the adjacent individual segment.
Figure 4:
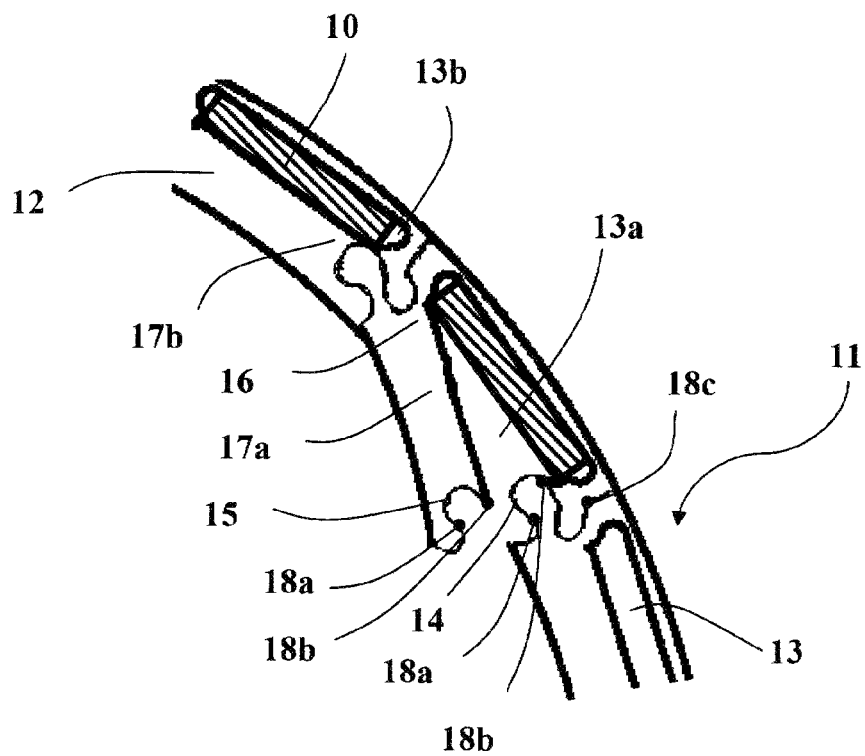
FIG. 4 shows a section of an alternative rotor made up from individual segments, wherein a third movable part of the individual segment is positioned such that the axial opening for installing permanent magnets is radially increased.

Magnetic flux is also influenced at any material transition. This is already the case if there is a gap between the individual segments 2. If this interstice is not potted, which involves technical difficulties and additional work, an air gap is created and the magnetic flux has to bridge first the material transition from rotor material to air and then the material transition from air to rotor material. In order to prevent this, it is advantageous that the individual segments 2 contact one another substantially along the first part 4. FIGS. 1, 3 and 4 show that the first part 4 of the individual segment 2 and the second corresponding part 5 of the adjacent individual segment 2 are preferably shaped such that they contact each other substantially over the entire theoretically possible contact surface without an air gap formed between the two parts.

The magnetic properties of the rotor 1 shown in FIG. 1 therefore largely correspond to the properties of a non-segmented rotor and include an analogous magnetic flux.

As an air gap between the individual segments 2 influences the magnetic flux in the rotor 1, the contact between the individual segments and the avoidance of an air gap are primarily related to a region of the first part 4 and the second part 5 of the individual segments 2 in which the magnetic flux of the rotor 1 is prevalent. Depending on design, the rotor 1 may include small regions without any magnetic flux. If such a region without any magnetic flux is situated at the contact surface of two adjacent individual segments 2, an air gap is not harmful at this point. As a result of the air gap, the contact surface of the two adjacent individual segments 2 now no longer extends across the entire first part 4.

Figure 2:
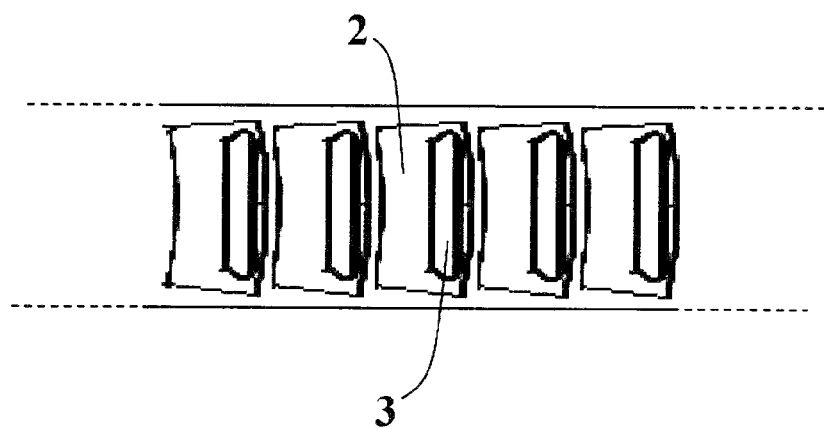
FIG. 2 shows a stamping arrangement of individual segments on a sheet metal strip.

FIG. 2 shows a possible a stamping arrangement of the individual segments 2 on a sheet metal strip.

Sheet metal offers good magnetic properties for rotors and simple production conditions. The shapes of the rotors are stamped out of the sheet metal and then joined to form sheet packs. In non-segmented rotors, the entire rotor ring has to be stamped out of the sheet metal, resulting in a lot of material waste. The arrangement and shape of the individual segments can be selected much better, so that material waste can be reduced. In addition, the stamping of individual segments can be carried out with smaller tools which can produce large quantities of individual segments 2. When stamping out the external shape of the individual segments 2, the axial opening 3 for the accommodation of the permanent magnet is advantageously produced as well.

As a result of their manufacturing process, sheet metals usually have a magnetic preferred direction which is taken into account in a stamping arrangement of the individual segments 2, so that a rotor 1 made up from individual segments 2 with uniform magnetic properties has symmetrical magnetic properties as well.

FIG. 3 shows a section of the rotor 1 with individual segments 2 and an opening 3 in the axial direction for the installation of permanent magnets. All of the individual segments 2 are identical and have the same shape. The sequence and the position of individual segments within the rotor 1 are therefore interchangeable, which simplifies the assembly process.

The illustrated shaping of the first part 4 of the individual segment 2 and the second corresponding part 5 of the adjacent individual segment 2 represents a positive connection in the axial and circumferential directions. A first region from point 8a to point 8b of the part 4 forms an outward curvature of the individual segment 2, which corresponds to an inward curvature of a first region from point 8a to point 8b of the part 5 of the adjacent individual segment 2; these are shaped such that the outward and inward curvatures engage both in the radial and in the circumferential direction. A suitable dimensioning of the engagement of the outward curvature of the part 4 and the inward curvature of the part 5 provides for a positive connection in the radial and circumferential directions.

With the preferred shaping shown in FIG. 3, the part 4 has a second region from point 8b to point 8c with an inward curvature of the individual segment 2 which corresponds to an outward curvature of a second region from point 8b to point 8c of the part 5 of the adjacent individual segment 2; these are likewise shaped such that the outward and inward curvatures engage both in the radial and in the circumferential direction. Owing to this second region, which also provides a positive connection in the radial and circumferential directions, the dimensions of both the first region from point 8a to point 8b and the second region from point 8b to 8c of the first part 4 and the corresponding second part 5 can be kept smaller, because the positive connection forces are distributed between the two regions. By reducing the dimensions of the outward and inward curvatures, material waste is reduced in stamping the sheet metal segments.

The outward curvatures are designed such that no edges are formed, which is advantageous in sheet metal stamping. The precise shaping of the outward and inward curvatures and the engagement dimensions depend on the forces which are expected and on the properties of the material used for the individual segments 2.

FIG. 4 shows an alternative embodiment of a rotor 11 according to the invention with individual segments 12, in which several features are identical to those of the rotor 1 of FIG. 3, so that essentially only the differences are described here and identical or identically acting components should be taken from FIG. 3.

All individual segments 12 of the rotor 11 are identical and interchangeable. For a better distinction between different assembly states in the drawing, a suffix a, b identifies two different assembly states of the identical individual segments 12.

An inward curvature of a first region from point 18a to point 18b of a second part 15 of the individual segment 12 is shaped such that the inward curvature extends to an opening 13, 13a, 13b in the axial direction for the accommodation of a permanent magnet 10. In the circumferential direction on the opposite side of the second part 15, a deformable region 16 is provided at the opening 13, 13a, 13b. The deformable region 16 is situated between the opening 13, 13a, 13b and a first part 14 of the individual segment 12 and, together with the inward curvature of the first region of the second part 15, which extends to the opening 13, 13a, 13b, forms in between a third movable part 17a, 17b of the individual segment 12. By way of the deformable region 16 on one side of the opening 13, 13a, 13b and the inward curvature extending to the opening 13, 13a, 13b in the circumferential direction on the other side of the opening 13, 13a, 13b, a radial dimension of the axial opening 13, 13a, 13b can be varied in between by means of the movable third part 17a, 17b. With the movable third part 17a and the movable third part 17b, different positions of one and the same component are shown, as well as the resulting different shapes of the openings 13a, 13b.

A second region from point 18b to point 18c of the part 15 of the individual segment 12 and a second region from point 18b to point 18c of a part 14 of an adjacent individual segment 12 provide, in analogy to FIG. 3, a positive form connection in the radial and circumferential directions between the two adjacent individual segments 12. The possibility of varying the radial dimension of the openings 13, 13a, 13b simplifies an insertion of the permanent magnets 10 into the opening 13, 13a, 13b. If the third movable part 17a of the individual segment 12 is in a position in which the radial dimension of the opening 13a is increased, as shown in FIG. 4, the permanent magnet 10 can easily be installed into the opening 13a with little effort. If, following the installation of the permanent magnet 10, the third movable part 17a is moved into a position in which the radial dimension of the axial opening 13b is reduced, the axial opening 13b is closed in the radial direction, thereby fixing the permanent magnet 10 in the opening 13b.

In the closed position, the movable part 17b is fixed by an outward curvature of a first region from point 18a to point 18b of the part 14 of the individual segment 12.

For this purpose, the inward curvature of the first region from point 8a to point 8b of the part 15 forms with the outward curvature of the first region from point 8a to point 8b of the part 14 of the adjacent individual segment 12 a slight engagement overlap so that the movable part 17b can, with the aid of an external force, overcome the engagement during a pivot movement for positioning the permanent magnet 10, but, following the insertion of the permanent magnet 10, only a small clamping force is generated by the movable part 17b which is effective to fix the permanent magnet 10, but which is insufficient to overcome the engagement between the two parts 14, 15.

The slight engagement of the first region of the part 14 with the first region of the part 15 holds the movable part 17a, 17b in position and locates it as illustrated by the movable part 17b while at the same time locating the permanent magnet 10 in the opening 13b. The clamping force acting on the permanent magnet 10 is always lower than a critical force at which the permanent magnet 10 would suffer structural damage. There is no need for further fastening steps or fasteners for securing the permanent magnet 10.

FIG. 4 also shows that the movable part 17a, 17b of the individual segment 12 is advantageously placed within the axial opening 13, 13a, 13b in the radial direction, because the secure location of the movable part 17a, 17b and the secure location of the permanent magnet 10 in the opening 13, 13a, 13b is supported by the outward-acting centrifugal forces of the rotating rotor 11 and by the press-fitting of the rotor 11 to a rotor support.

The outward and inward curvatures of the parts 14 and 15 are without edges, because this shaping simplifies the stamping of the sheet metal.

Figure 5:
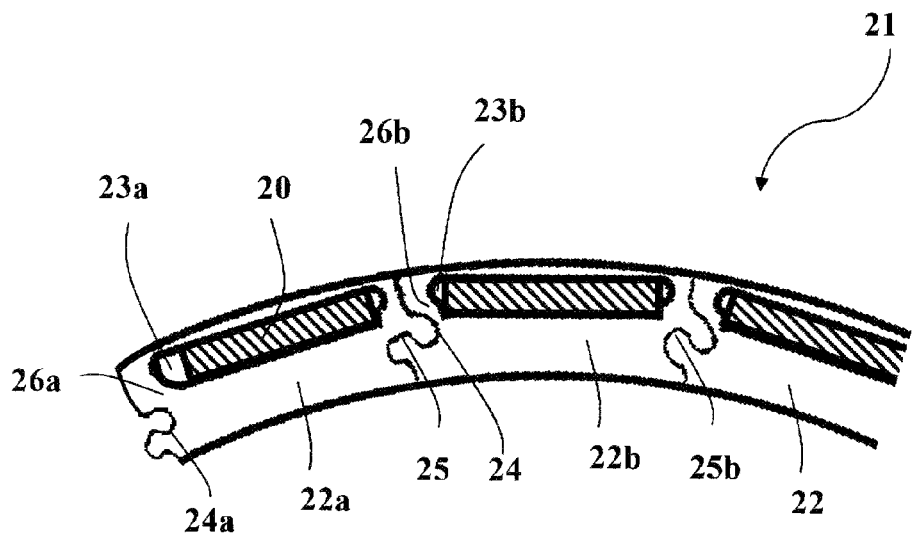
FIG. 5 shows a section of an alternative rotor made up from individual segments which have a deformable region.

FIG. 5 shows an alternative embodiment of a rotor 21 according to the invention with individual segments 22, in which several features are identical to those of the rotor 11 from FIG. 4, so that essentially only the differences are described here and identical or identically acting components should be taken from FIG. 4.

The rotor 21 shown in FIG. 5 is only partially assembled: not all of the individual segments 22 have been installed, and not all of the individual segments 22 have an adjacent individual segment 22 on both sides. All individual segments 22 are identical in design, and for a better distinction within the rotor 21, the individual segments 22 are identified by a suffix a, b in order to distinguish an individual segment 22a with only one adjacent individual segment 22 from an individual segment 22b with two individual segments 22.

The individual segment 22 comprises a first part 24 and a second part 25, the first part 24 of an individual segment 22 forming in the assembled state with the second part 25 of the individual segment 22 a positive connection in the circumferential and radial directions. The individual segment 22 has an opening 23a, 23b in the axial direction for the accommodation of a permanent magnet 20. Between the opening 23a, 23b and the first part 24, 24a, a deformable region 26a, 26b is provided.

The individual segment 22a is in this assembly state positively connected to the first part 24 of the adjacent individual segment 22b via the second part 25 of the individual segment 22a. The first part 24a of the individual segment 22a is not yet connected to an adjacent individual segment 22. The first part 24a, the opening 23a and the deformable region 26a between the opening 23a and the first part 24a of the individual segment 22a are shown in their original form without any deformation of the deformable part 26a by external force. The opening 23a is in its basic form designed such that the permanent magnet 20 can be inserted into the opening 23a simply and without much effort. For this purpose in particular, a dimension of the opening 23a in the radial direction and/or in the circumferential direction may be larger than the respective dimension of the permanent magnet 20. In this assembly state, the permanent magnet 20 is installed into the opening 23a before a further individual segment 22 is joined to the first part 24a of the individual segment 22a.

The individual segment 22b has two adjacent individual segments 22, so that a positive connection to an adjacent individual segment 22 is established both via the first part 24 of the individual segment 22b and via the second part 25b of the individual segment 22b. By joining the second part 25 of the individual segment 22a to the first part 24 of the individual segment 22b, an external force is applied which, while the individual segment 22a is being joined to the individual segment 22b, deforms the deformable part 26b of the individual segment 22b in such a way that the size of the opening 23b with the already installed permanent magnet 20 is reduced in the circumferential and/or in the radial direction. A size reduction of the opening 23a by the deformable region 23b while joining the individual segments 22 generates a clamping force of the opening 23b which acts on the permanent magnet 20, so that the permanent magnet 20 is fixed in the opening 23b by this clamping force. The clamping force acting on the permanent magnet 20 is always lower than a critical force at which the permanent magnet 20 would suffer structural damage. There is no need for further fastening steps or fasteners for securing the permanent magnet 20.

In further embodiments not shown in the drawing, the deformable region may in particular be placed between a second part of the individual segment and the opening in the axial direction for the accommodation of a permanent magnet, or a deformable region each may be provided between the first part and the opening and between the second part and the opening. Any deformation of a deformable region can be slight if deformable regions are provided on both sides of the opening for the accommodation of a permanent magnet and nevertheless securely fix the permanent magnet in the opening as a result of the overall reduction of its size. At such a slight deformation, the external force required for deforming the deformable region is low, so that the individual segments can be joined together simply while the material is treated gently.

Figure 6:
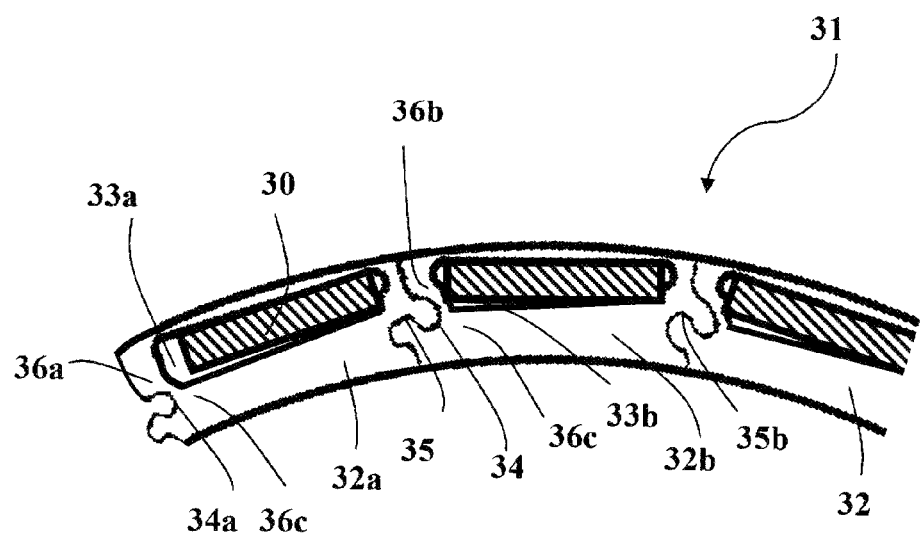
FIG. 6 shows a section of an alternative rotor made up from individual segments, in each of which a deformable region in the radial direction is provided within the opening for the accommodation of a permanent magnet.

FIG. 6 shows an alternative embodiment of a rotor 31 according to the invention with individual segments 32, in which several features are identical to those of the rotor 21 from FIG. 5, so that essentially only the differences are described here and identical or identically acting components should be taken from FIG. 5.

The rotor 31 shown in FIG. 6 is only partially assembled: not all of the individual segments 32 have been installed, and not all of the individual segments 32 have an adjacent individual segment 32 on both sides. All individual segments 32 are identical in design, and for a better distinction within the rotor 31, the individual segments 32 are identified by a suffix a, b in order to distinguish an individual segment 32a with only one adjacent individual segment 32 from an individual segment 32b with two individual segments 32.

Each individual segment 32 comprises a first area 34 and a second area 35, the first area 34 of the individual segment 32 forming in the assembled state with the second area 35 of the adjacent individual segment 32 a positive connection in the circumferential and radial directions. The individual segment 32 has an opening 33a, 33b in the axial direction for the accommodation of a permanent magnet 30. Between the opening 33a, 33b and the first part 34, 34a, a deformable region 36a, 36b is provided, a sub-region 36c of the deformable region 36a, 36b being located within the opening 33a, 33b in the radial direction. The sub-region 36c of the deformable region 36a, 36b coincides in the circumferential direction with the opening 33a, 33b, so that during a deformation of the deformable region 36a, 36b the sub-region 36c reduces the size of the opening 33a, 33b in the radial direction. The permanent magnet 30 is installed into the opening 33a, 33b before the deformation. By reducing the size of the opening 33a, 33b in the radial direction by the deformation of the sub-region 36c, the permanent magnet 30 is securely fixed in the opening 33a, 33b by the clamping force of the opening 33a, 33b.

In the assembly state of the rotor 31 as shown in FIG. 6, the deformable region 36a and the opening 33a have not yet been deformed; the figure shows a shaping of the individual segments 32a before they are assembled into the rotor 31.

In the assembly step of joining the individual segment 32a to the individual segment 32b, the deformable region 36b has been deformed such that the size of the opening 33b is reduced in the circumferential direction and the permanent magnet is securely fixed in the opening 33b. In the region where it overlaps with the sub-region 36c of the deformable region 36b, the opening 33b still has a radial dimension which is larger than the permanent magnet 30. As the rotor 31 is press-fitted to a rotor support, the force generates an external deformation force which so deforms the sub-region 36c of the deformable region 36a, 36b in the radial direction that the dimension of the opening 33a, 33b becomes smaller in the radial direction. This size reduction of the opening 33a, 33b in the radial direction generates a clamping force of the opening 33a, 33b, which acts on the permanent magnet 30 and securely fixes it in the opening 33a, 33b.

A deformation of the sub-region 36c may in particular coincide with a deformation of the deformable region 36a, 36b while the individual segments 32 are assembled to provide the rotor 31, wherein, between the first part 34 of an individual segment 32 and the second part 35 of an adjacent individual segment 32, a deformation force acts on the sub-region 36c at a position which is radially within the opening 33a, 33b.

The clamping force acting on the permanent magnet 30 is always lower than a critical force at which the permanent magnet 30 would suffer structural damage. There is no need for further fastening steps or fasteners for securing the permanent magnet 30.

What is claimed is:

1. A rotor of an electric machine, consisting of individual segments (2, 12, 22, 32), each individual segment (2, 12, 22, 32) having a first part (4, 14, 24, 34) which, in an assembled state, is in contact with a second cooperating part (5, 15, 25, 35) of an adjacent individual segment, the first part (4, 14, 24, 34) of the individual segment and the second cooperating part (5, 15, 25, 35) of the adjacent individual segment forming a positive connection between the first part (4, 14, 24, 34) and the second cooperative part (5, 15, 25, 35) in the radial and circumferential directions, each individual segment (2, 12, 22, 32) having an opening (3, 13, 23, 33) extending in the axial direction for the accommodation of a permanent magnet, and each individual segment (2, 12, 22, 32) having a deformable region (16, 26a, 26b, 36a, 36b) at least between one of the first part (14, 24, 34) of the individual segment and the opening (3, 13, 23, 33) and between the second cooperating part (5, 15, 25, 35) of the individual segment and the opening (3, 13, 23, 33), the deformable region (16, 26a, 26b, 36a, 36b), following the joining of the individual segments (12, 22, 32), being deformed in such a way that the size of the opening (3, 13, 23, 33) for the accommodation of a permanent magnet is reduced in at least one of the radial direction and the circumferential direction for firmly engaging and fixing the respective permanent magnet in the respective opening (3, 13, 23, 33).

2. The rotor according to claim 1, wherein the deformable region (16, 26a, 26b, 36a, 36b) is situated at an end of the opening and in the radial direction of the rotor inside the opening (3, 13, 23, 33) and is shaped such that, after the press-fitting of the assembled individual segments (12, 22, 32) to a rotor support, the deformable region (16, 26a, 26b, 36a, 36b) is deformed toward the opening (3, 13, 23, 33) for engaging and fixing the permanent magnet within the opening.

3. The rotor according to claim 2, wherein the opening (13a) is partially bounded by a third movable part (17a,) of the individual segment (17a), which third movable part (17a, 17b) is designed such that it can be bent inwardly to facilitate access to the opening (13) in the radial direction for insertion of the magnet into the opening, the third movable part (17a, 17b) being securely engaged during the operation of the rotor by an curved section of one of the respective individual segment (12) and of the adjacent individual segment.

* * * * *